United States Patent [19]

Adolfsson et al.

[11] Patent Number: 4,498,004

[45] Date of Patent: Feb. 5, 1985

[54] FIBER OPTICAL MEASURING DEVICE, EMPLOYING A SENSOR MATERIAL WITH A NON-LINEAR INTENSITY RESPONSE CHARACTERISTIC FOR MEASURING PHYSICAL QUANTITIES

[75] Inventors: Morgan Adolfsson; Torgny Brogardh; Sture Göransson; Christer Ovrén, all of Västerås, Sweden

[73] Assignee: ASEA Aktiebolag, Västerås, Sweden

[21] Appl. No.: 379,026

[22] Filed: May 17, 1982

[30] Foreign Application Priority Data

May 18, 1981 [SE] Sweden .............................. 8103100

[51] Int. Cl.³ .............................................. G02B 5/14
[52] U.S. Cl. .................................. 250/227; 250/231 R
[58] Field of Search ........................... 250/227, 231 R; 350/96.1, 96.24; 455/610, 612

[56] References Cited

U.S. PATENT DOCUMENTS

| | | | |
|---|---|---|---|
| 4,207,459 | 6/1980 | Nakamura et al. | 455/613 |
| 4,281,245 | 7/1981 | Brogardh et al. | 250/227 |
| 4,290,146 | 9/1981 | Adolfsson et al. | 455/612 |
| 4,378,496 | 3/1983 | Brogardh et al. | 250/227 |

Primary Examiner—David C. Nelms
Attorney, Agent, or Firm—Watson, Cole, Grindle & Watson

[57] ABSTRACT

The invention relates to a measuring device for measuring physical and/or chemical quantities, comprising a measuring transducer and an evaluating electronic unit interconnected by at least one light-conducting fiber, said evaluating electronic unit comprising one or more light sources for transmitting light via said fiber/fibers to at least one sensor element, forming a part of said transducer, said evaluating electronic unit also comprising one or more light detectors for detecting light emitted from said sensor element(s). The invention is characterized in that said at least one sensor element possesses a non-linear relationship between the incident light intensity illuminating the sensor element and the intensity of the light emitted from the sensor element, that said light source/light sources are arranged to emit light having at least two, non-identical light intensities, and that at the same time said detector/detectors are arranged to measure the light coming from the sensor element.

12 Claims, 8 Drawing Figures

FIBER OPTICAL MEASURING DEVICE, EMPLOYING A SENSOR MATERIAL WITH A NON-LINEAR INTENSITY RESPONSE CHARACTERISTIC FOR MEASURING PHYSICAL QUANTITIES

TECHNICAL FIELD

The present invention relates to a measuring device for measuring physical and/or chemical quantities, comprising a measuring transducer, which includes at least one sensor element, and an evaluating electronic unit, interconnected by at least one light-conducting fiber. The evaluating electronic unit comprises at least one light source for emitting light via said at least one fiber to said at least one sensor element, and said evaluating electronic unit comprises at least one light detector for detecting the light emitted from said at least one sensor element.

The use of the phrase "light" throughout this specification and its claims is intended to include electromagnetic radiation in the ultraviolet and infrared regions of the spectrum and not just the narrow band of frequencies in the visible spectrum.

PRIOR ART ARRANGEMENT

It is previously known to construct a fiber optical measuring apparatus in which the quantity to be measured influences an optical property of a sensor element such as the spectral position and shape of an absorption edge or the location or shape of a luminescence peak. A problem in connection with such opto-electronic measuring systems (see for example the system shown in FIG. 1) is, among other things, the temperature dependence of the spectral properties of the light-source(s), any filters used and the light detector(s). In prior art constructions one or more of these components has been carefully stabilized as to temperature, and this can involve problems. Attempts have been made to solve this by compensating the measuring signal for varying fiber damping by generating a measuring signal which is the quotient of the signal emitted in two, non-identical wavelength ranges, within which ranges the sensor element is influenced to different degrees by the quantity to be measured. However, this method is not always effective to obtain a sufficient accuracy of measurement.

One object of the present invention is to provide a solution to this temperature stability problem and other problems associated therewith.

BRIEF STATEMENT OF INVENTION

A fiber optical measuring device according to the present invention is characterized in that said at least one sensor element possesses a non-linear relationship between the light intensity of the incident light which illuminates it and the light intensity of the light which emanates from the sensor. The light source means is arranged to emit light with at least two, non-identical light intensities, and at the same time said detector means is arranged to measure the light coming from the sensor element(s). Thus, in this case material with a non-linear light in/light out characteristic is employed in each sensor element for measuring the physical quantity. The non-linearity is determined by the outer parameter which is to be measured and the measuring device makes possible a general method of measurement which can be applied to an arbitrary optical property of the sensor element material, for example its absorption, reflection or luminescence. One example, where luminescence in ZnS: Ag, Ni is employed, provides considerable advantages in comparison with prior art devices, in particular, permitting the use of a considerably simplified optical system.

BRIEF DESCRIPTION OF DRAWINGS

Embodiments of optical measuring devices according to the invention will now be described, by way of example, with reference to the accompanying drawings, in which.

DESCRIPTION OF PRIOR ART DEVICE

Figure 1:
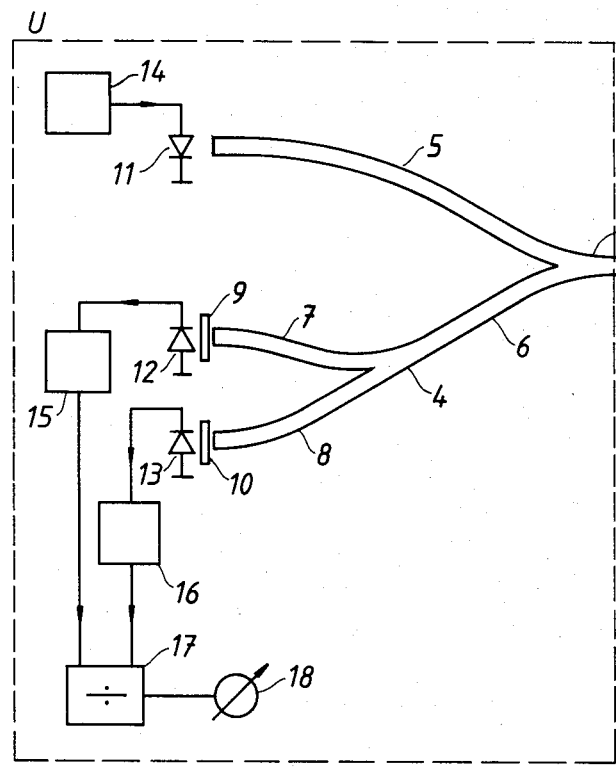
FIG. 1 shows a typical prior art measuring device as generally described above.

The invention relates to an improved optical measuring device for measuring physical and/or chemical quantities. It is known to construct a fiber optical measuring device according to FIG. 1, where the quantity to be measured influences a sensor element to change the spectral position and shape of an absorption edge or of a luminescence peak of the material of the element 1. These changes are detected by transmitting light emitted from an LED 11 via an optical fiber 5, a branch 3 and an optical fiber 2 to the sensor element 1 within a measuring transducer generally designated G, and by passing the light which emanates from the sensor element 1 back via the fiber 2, the branch 3, a fiber 6, a branch 4 and further fibers 7 and 8 to optical filters 9 and 10 and thus to photo-diodes 12 and 13 for spectral analysis. The photo-diode currents are amplified in amplifiers 15 and 16, and after forming a quotient of these currents in a quotient forming unit 17, a measuring signal is obtained, which is compensated for varying damping of the fiber 2. This compensated measuring signal is supplied to an indicating or registering instrument 18.

A problem in connection with a prior art opto-electronic measurement system such as that shown in FIG. 1 is, among other things, the temperature dependence of the spectral properties of the LED 11, the filters 9, 10 and the photo-diodes 12, 13. In prior art constructions one or more of these components must be carefully temperature-stabilized.

DESCRIPTION OF EMBODIMENTS ACCORDING TO THE INVENTION

The present invention proposes a measuring device which eliminates the above-mentioned practical problems, while at the same time allowing a simpler fiber optical system to be used. In the device shown in FIG. 1, the measuring signal is compensated for varying fiber damping by forming the quotient of signals obtained in two, non-identical wavelength ranges, within which ranges the sensor element is influenced to differing degrees by the quantity being measured. Instead of this spectral division, an amplitude division is employed according to the present invention, whereby the spectral properties of the opto-electronic system become of secondary importance.

Figure 2:
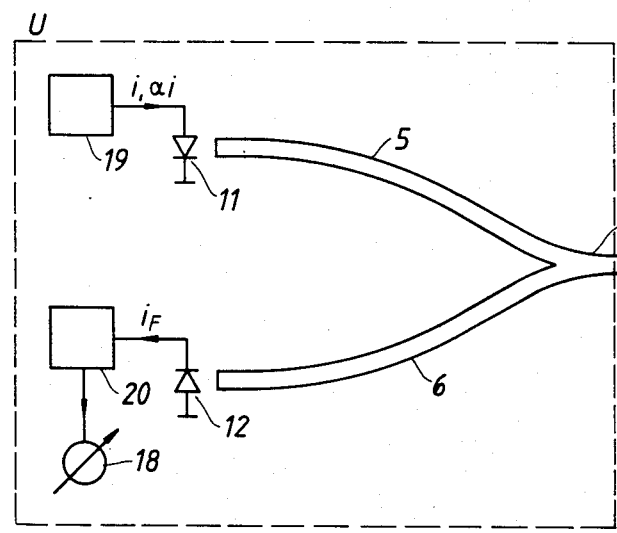
FIG. 2 shows an opto-electronic measuring device employing amplitude division according to the invention.

FIG. 2 shows one embodiment of an opto-electronic measuring device according to the invention which employs amplitude division. An LED 11, which is not temperature-stabilized, is driven alternately with two different injection currents $i$ and $\alpha i$. The resulting emitted light is coupled via the fibre 5, the branch 3 and the fibre 2 to the sensor element 1. The light returning from the sensor element 1 is passed back via the fibre 2, the branch 3 and the fibre 6 to the photo-diode 12, which thus senses the light from the sensor element 1 at the two different light levels set by the two different amplitudes of emission from the LED 11.

In those cases where the physical property of the sensor element which is utilized for the measurement is its photo-luminescence, it can be advantageous to provide the LED 11 with an optical filter (not shown), which blocks off any light emission from the LED 11 which lies in that part of the spectrum where the material of the sensor element 1 luminesces. Further, the photodetector 12 can be provided with an optical filter (also not shown) which blocks off radiation in the wavelength interval where the LED emits. The demand for reproducibility in the manufacture of these optical filters, and their stability as regards their optical properties is, however, very small compared with the filters required for prior art measuring devices which employ spectral analysis.

In the following a more detailed description of the mode of operation of one sensor element 1 and the mode of operation of the electronic units 19 and 20 will be given.

Figure 3:
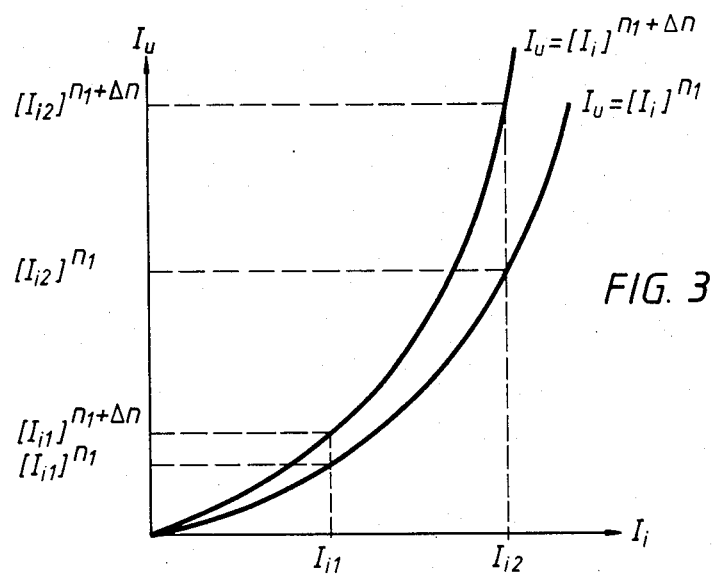
FIG. 3 shows the non-linear characteristic of the sensor material employed in the device of FIG. 2.

For a measuring device according to the invention, a sensor material can be used which has a non-linear characteristic according to FIG. 3. The intensity of the light which returns from the sensor element, $I_u$ is here assumed to have the formula $$I_u = (I_i)^n$$

where $I_i$ is the intensity of the incident light falling on the sensor element and the exponent n is dependent on the quantity being measured according to the relationship $$\Delta n = f(m)$$

where $\Delta n$ is the change of n, m is the value of the quantity being measured, and f is the functional relationship which prevails between m and n.

Let is be assumed that the LED 11 shown in FIG. 2 is alternately driven with currents $i$ and $\alpha i$, where $\alpha$ is a constant $>0$. If the current/light intensity efficiency of the LED is $\eta_1$, the coupling efficiency between the LED and the fiber 5 is $\eta_2$, the damping in the fibre 5 is $d_5$, in the branch 3 is $d_3$ and in the fibre 2 is $d_2$, the following values of the light intensities $I_{i1}$ and $I_{i2}$ in FIG. 3 are obtained:

$$I_{i1} = \eta_1 \cdot \eta_2 \cdot d_5 \cdot d_3 \cdot d_2 \cdot i = k_1 \cdot i$$

$$I_{i2} = \eta_1 \cdot \eta_2 \cdot d_5 \cdot d_3 \cdot d_2 \cdot \alpha \cdot i = k_1 \cdot \alpha \cdot i$$

If the coupling efficiency from the sensor element to the fiber 2 is $\eta_3$, the damping in the fibre 6 is $d_6$ and and the efficiency light/current in the photo-diode 12 is $\eta_4$ the following values of the photo-current $i_F$ are obtained:

$$i_{F1} = \eta_3 \cdot d_2 \cdot d_3 \cdot d_6 \cdot \eta_4 \cdot I_{u1} = k_2 \cdot I_{u1}$$

$$i_{F2} = \eta_3 \cdot d_2 \cdot d_3 \cdot d_6 \cdot \eta_4 \cdot I_{u2} = k_2 \cdot I_{u2}$$

where $I_u$ is the light emitted from the sensor element 1.

With the stated functional relationships in the sensor element, the following relationships are obtained between the LED currents and the photo-diode currents:

$$i_{F1} = k_2(k_1 \cdot i)^{n_1} = k_2(k_1)^{n_1} \cdot (i)^{n_1}$$

$$i_{F2} = k_2(k_1 \cdot \alpha \cdot i)^{n_1} = k_2(k_1)^{n_1} \cdot (i)^{n_1} \cdot (\alpha)^{n_1}$$

By obtaining the quotient K between $i_{F2}$ and $i_{F1}$, the following is obtained $$K = \frac{i_{F2}}{i_{F1}} = (\alpha)^{n_1}$$

When K is measured, $\alpha$, $n_1$ and f are unknown, m may be calculated as follows:

$$m = f^{-1}(\log_\alpha K - n_1)$$

If $\alpha = e$, the following is obtained $$m = f^{-1}(\ln K - n_1)$$

Thus, an expression for the quantity being measured is obtained, which is independent of the instable parameters $\eta_1$, $\eta_2$, $d_5$, $d_3$, $d_2$, $\eta_3$, $d_6$ and $\eta_4$.

Figure 4:
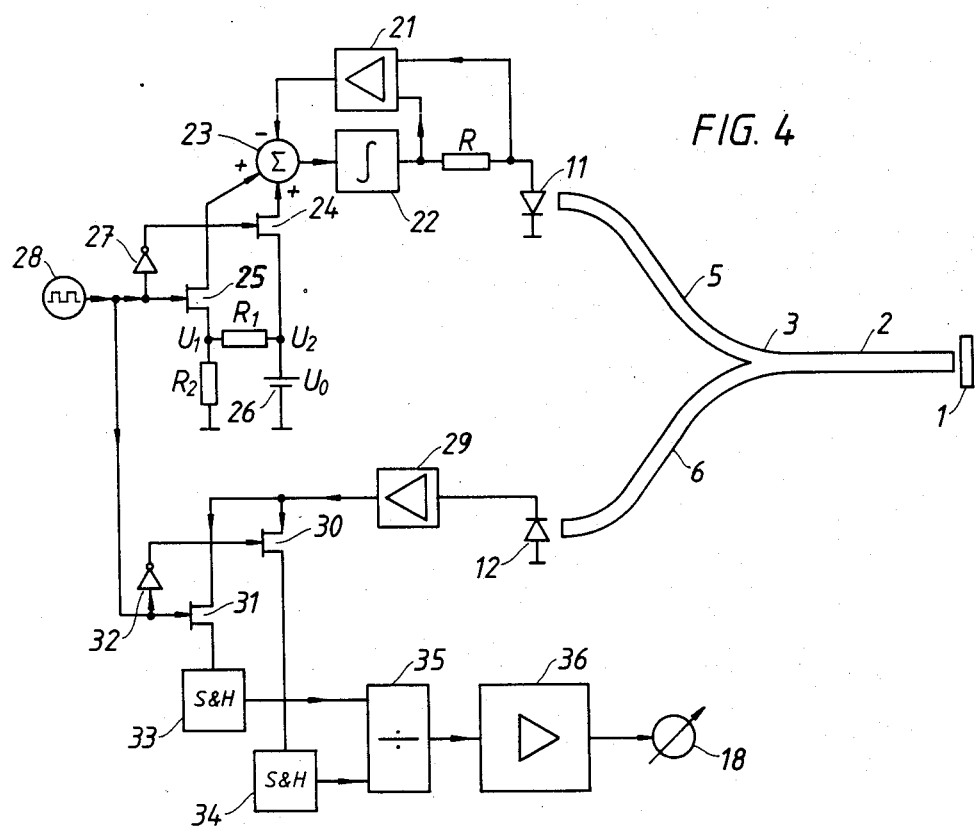
FIG. 4 shows one arrangement of the necessary control circuits for a light-emitting diode (LED) and the measuring circuits for a photo-diode in a device according to the invention.

The necessary control circuits for the LED 11 and the measuring circuits for the photo-diode 12 can be constructed in a plurality of different ways, one way being shown in FIG. 4. With the aid of an inverter 27 and analog switches 24 and 25, an oscillator 28 alternately switches in the reference values $U_2$ and $U_1$, respectively, to a current regulator 22 of the LED 11. The LED current is measured across a resistor R by an amplifier 21 and is compared in a comparison device 23 with $U_2$, alternatively with $U_1$, and the difference signal from the comparison device 23 controls the regulator 22 which feeds the LED 11. The reference values $U_2$ and $U_1$ are given by:

$$U_2 = U_0$$

$$U_1 = \frac{R_2}{R_1 + R_2} U_0$$

where $U_0$ is output of a voltage source 26 and $R_1$ and $R_2$ the resistors shown in FIG. 4.

The signal from the photo-diode 12 is amplified in an amplifier 29 and is switched alternately by analog switches 30 and 31 into sample and hold (S&H) circuits 33 and 34. The S & H circuit 33 is switched in at the lower LED current i and the S & H circuit 34 is switched in at the higher current $\alpha i$.

$$\left(\alpha = \frac{R_1 + R_2}{R_2}\right).$$

The quotients of the output signals of the S & H circuits 33 and 34 are formed in a quotient forming device 35, and in an amplifier 36, the value of m is calculated, which is supplied to the registering instrument 18.

Figure 5:
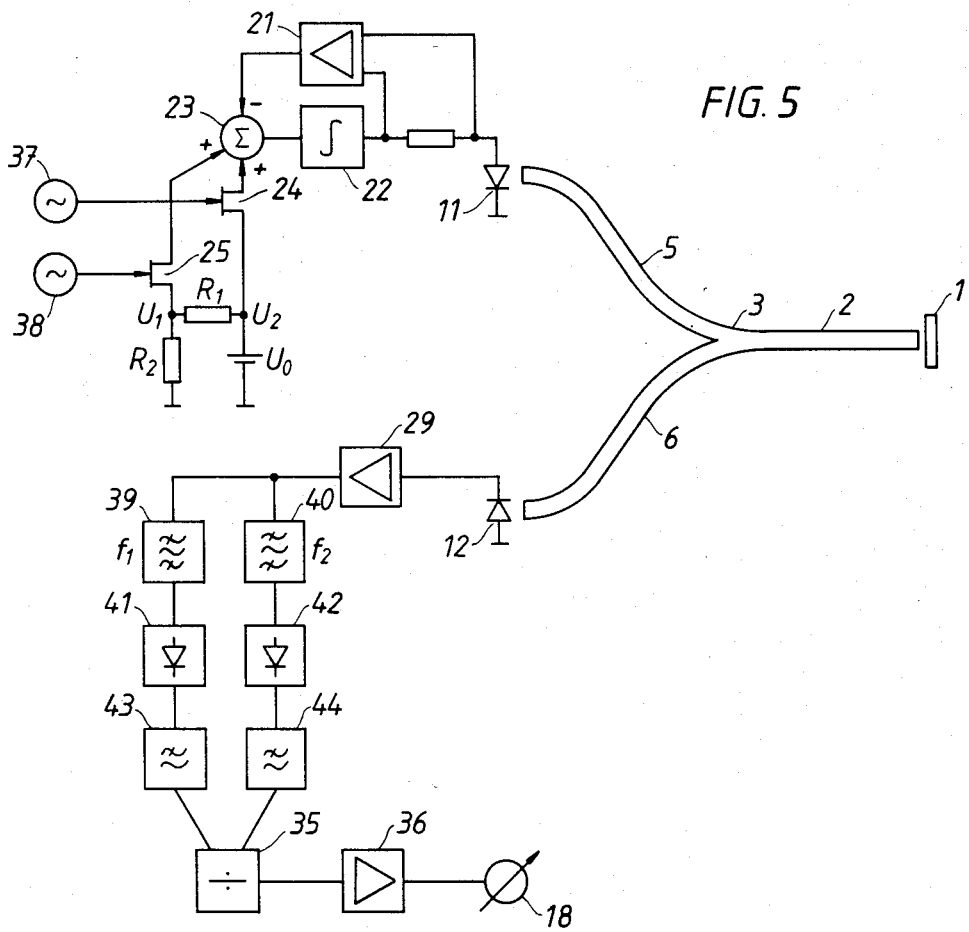
FIG. 5 shows a second embodiment of device according to the invention which employs frequency-division multiplexing.

Instead of time division multiplexing of the two currents i and $\alpha i$ through the LED 11, frequency division multiplexing can be performed with the arrangement shown in FIG. 5. The LED electronic system is identical with that of FIG. 4 apart from the fact that the analog switches 24 and 25 are here controlled from two separate oscillators 37 and 38 with the center frequencies $f_1$ and $f_2$. On the receiver side, the detector signal is divided by band pass filters 39 and 40 into the two modulation frequencies $f_1$ and $f_2$, and after rectifying in rectifiers 41 and 42, respectively, and low-pass filtering in filters 43 and 44, respectively, the detector signals corresponding to i and $\alpha i$ are obtained. After forming the quotient in the quotient forming device 35 and calculating m in the amplifier 36, the measured value is again obtained in the instrument 18.

Figure 8:
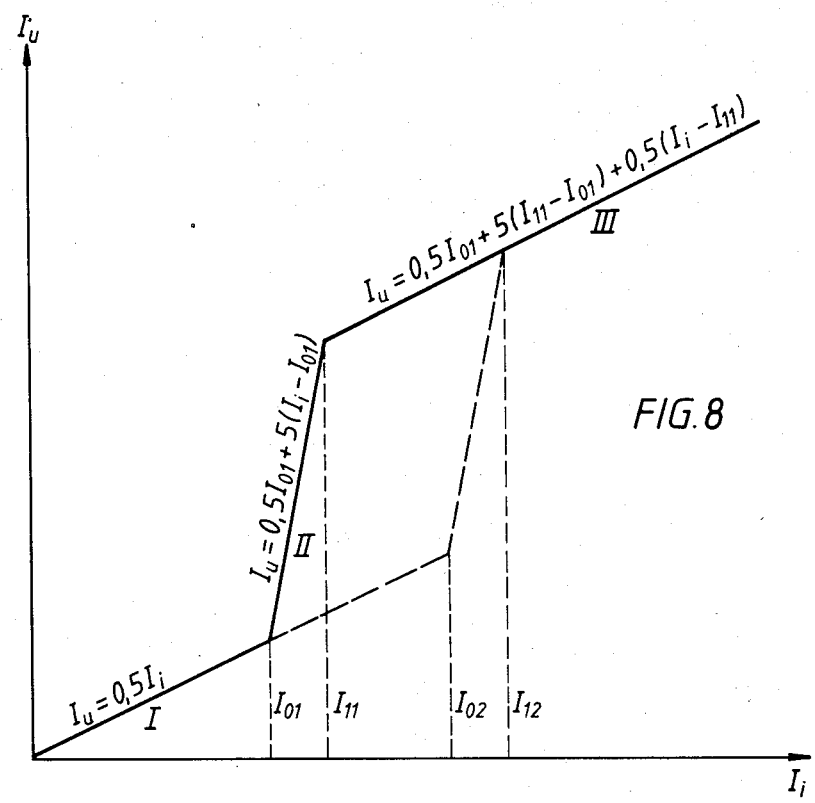
FIG. 8 shows one example of non-linearity, consisting of three linear functions, in the property of a sensor element.

In those cases where the non-linearity in the sensor element 1 is not in accordance with the formula $I_u = (I_i)^n$, a more sophisticated evaluating electronic unit than the quotient former 35 must be used, and the light source means 11 may need to be run at more than two light intensities. One example of this is shown in FIG. 8, where the non-linearity consists of a linear function divided into three linear segments:

$$I_u = 0.5 I_i \quad (I)$$

$$I_u = 5 I_i - 4.5 I_{01} \quad (II)$$

$$I_u = 0.5 I_i - 4.5 I_{01} + 4.5 I_{11} \quad (III)$$

The following calculations show how it is possible to make use of a linear function divided into three segments to eliminate the unknown measurement system parameters $k_1$ and $k_2$:

$$I_F = k_2 \cdot I_u; \quad I_u = (I_F/k_2)$$

Segment I:

$$\frac{I_F}{k_2} = 0.5 \, k_1 \cdot i$$

$$k_1 \cdot k_2 = 2 \cdot \frac{I_F}{i} = 2 \cdot K_I \rightarrow k_1 = \frac{2K_I}{k_2}$$

where $K_I$ constitutes the inclination of $I_F(i)$.

Segment II:

$$\frac{I_F}{k_2} = 5 \, k_1 \cdot i - 4.5 \, I_{01}$$

$$\frac{I_F}{k_2} = 5 \cdot \frac{2K_I}{k_2} \cdot i - 4.5 \, I_{01}$$

-continued $$I_{01} = \frac{10 K_I \cdot i - I_F}{4.5 \, k_2}$$

Segment III:

$$\frac{I_F}{k_2} = 4.5 \, I_{11} - 4.5 \, I_{01} + 0.5 \cdot \frac{2K_I}{k_2} \cdot i$$

$$I_{01} - I_{11} = \frac{K_I \cdot i - I_F}{4.5 \, k_2}$$

Forming the quotient of the expressions for $I_{01}$ and $I_{01} - I_{11}$, yields $$\frac{I_{01} - I_{11}}{I_{01}} = \frac{(K_I \cdot i_{III} - I_{FIII}) \cdot k_2}{k_2 \cdot (10 K_I \cdot i_{II} - I_{FII})}$$

$$\frac{I_{11}}{I_{01}} = 1 - \frac{K_I \cdot i_{III} - I_{FIII}}{10 K_I \cdot i_{II} - I_{FII}}$$

$I_{01}$ and $I_{11}$ are the break points of the continuous curve shown in FIG. 8. If the quantity being measured is changed, $I_{01}$ and $I_{02}$ will be changed in such a way that the linear region II is displaced in parallel in the $I_i$-direction, which is shown by the dash-lined curve. The same equations are still valid for the line segments, the only difference being that $I_{01}$ and $I_{11}$ change into $I_{02}$ and $I_{12}$. Thus, the quotient $$\frac{I_{12}}{I_{02}} \neq \frac{I_{11}}{I_{01}},$$

and the above expression for $(I_{1X}/I_{0X})$ constitutes a value of the quantity being measured which is independent of $k_1$ and $k_2$.

The computation of $(I_{1X}/I_{0X})$ is suitably performed with a microcomputer or a tailor-made microprocessor for increased computing speed. The measurement procedure is thus as follows:

1. Store $I_F(i)$ in a digital memory with a resolution which is sufficient for the requirements of the accuracy of measurement. This is done, for example, by generating a current ramp to the light source while at the same time the detector signal is measured and read into the memory.
2. Process the stored information by first computing the inclination of $I_F(i)$ in segment I, that is, produce $K_I$.
3. Compute in segment II $(10 K_I \cdot i - I_F) = A$.
4. Compute in segment III $(K_I \cdot i - I_F) = B$.
5. Compute $(I_{11}/I_{01}) = 1 - B/A$.

To utilize the information in the stored non-linearity relationships as far as possible, mean values are formed when computing $K_I$, A and B.

It is thus easily proved that a partially linear sensor function with three or more linear segments can be used for compensating the unknown parameters $k_1$ and $k_2$. If the sensor is designed in such a way that different quantities to be measured influence different parts of the non-linearity, several quantities may be measured at the same time, which is important, for example, if it is desired to compensate a transducer signal for the effect of temperature on the transducer.

The result from the analysis with a partially linear function can be generalized to other non-linear functions, and therefore a measuring device according to the invention constitutes a powerful apparatus for measuring physical and chemical quantities with the aid of non-linear physical and chemical relationships.

Figure 6:
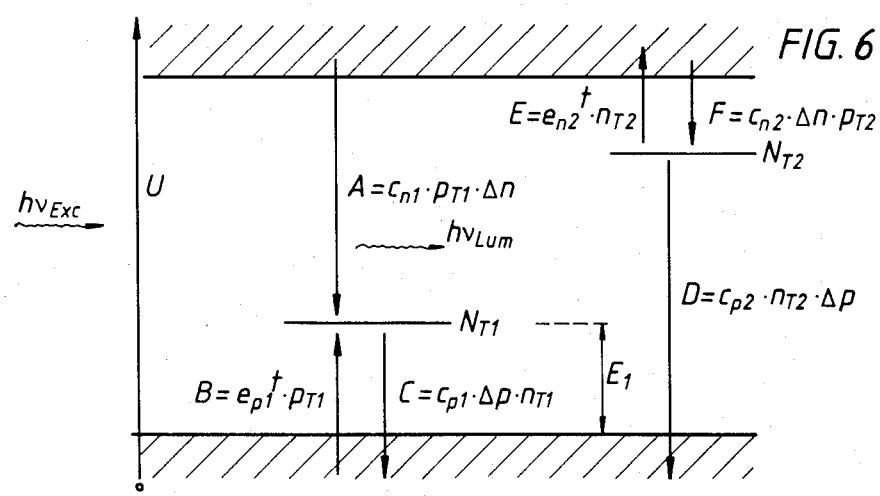
FIG. 6 shows an energy level diagram for a doped semiconductor material with dopants usable as a sensor element in a device according to the invention.

Non-linear effects, where the non-linearity is due to an external parameter, may be obtained in, for example, semiconductor materials in a great many different ways. One example of a system where the non-linearity in the photo-luminescence excitation curve is utilized for measuring temperature is given below. FIG. 6 shows an energy level diagram for a semiconductor material containing, as dominant dopants, two types of impurities, namely impurities with a concentration $N_{T2}$ across which recombination is non-radiant, and impurities with a concentration $N_{T1}$ across which recombination takes place with the emission of light. It is assumed that the impurities $N_{T1}$ and $N_{T2}$, respectively, constitute the dominating recombination paths for excess charge carriers.

Let it be assumed that dopants and dopant concentrations are chosen in such a way that $$N_{T2} = N_{T1}$$

$$C_{n2} >> C_{n1} \text{ (capture cross-section)}$$

$$C_{p2} = C_{p1}$$

$$p_{T2} \simeq N_{T2} >> n_{T2}$$

$$n_{T1} \simeq N_{T1} >> p_{T1}$$

$$n_{T1} = p_{T2}$$

$$p_{T1} = N_{T1} - n_{T1} = N_{T2} - p_{T2} = n_{T2}$$

At low excitation densities, the main part of the recombination takes place across $N_{T2}$ and this applies to $$F = E + D$$

$$C_{n2} \cdot \Delta n \cdot p_{T2} = e'_{n2} \cdot n_{T2} + C_{p2} \cdot n_{T2} \cdot \Delta p$$

$$\rightarrow \Delta n \simeq \frac{e'_{n2} \cdot n_{T2}}{C_{n2} \cdot p_{T2}} \simeq \frac{e'_{n2} \cdot p_{T1}}{C_{n2} \cdot N_{T2}}$$

Further, the following applies $$B + A = C$$

$$e'_{p1} \cdot p_{T1} + C_{n1} \cdot p_{T1} \cdot \Delta n = C_{p1} \cdot \Delta p \cdot n_{T1}$$

$$\rightarrow \Delta p \simeq \frac{e'_{p1} \cdot p_{T1}}{C_{p1} \cdot n_{T1}} \simeq \frac{e'_{p1} \cdot p_{T1}}{C_{p1} \cdot N_{T1}}$$

However, $U \simeq D$ in the case of low excitation density $$\rightarrow U = C_{p2} \cdot n_{T2} \cdot \Delta p \quad (I)$$

$$\rightarrow \frac{U}{C_{p2} \cdot n_{T2}} = \frac{U}{C_{p2} \cdot p_{T1}} = \frac{e'_{p1} \cdot p_{T1}}{C_{p1} \cdot N_{T1}}$$

$$(p_{T1})^2 = \frac{C_{p1}}{C_{p2}} \cdot \frac{N_{T1}}{e'_{p1}} \cdot U$$

The luminescence intensity is given by $$A = C_{n1} \cdot p_{T1} \cdot \Delta n = C_{n1} \cdot \frac{e'_{n2}}{C_{n2} \cdot N_{T2}} \cdot \frac{C_{p1}}{C_{p2}} \cdot \frac{N_{T1}}{e'_{p1}} \cdot U \quad (II)$$

-continued $$\therefore A = \frac{C_{n1}}{C_{n2}} \cdot \frac{C_{p1}}{C_{p2}} \cdot \frac{N_{T1}}{N_{T2}} \cdot \frac{e'_{n2}}{e'_{p1}} \cdot U = \frac{C_{n1}}{C_{n2}} \cdot \frac{e'_{n2}}{e'_{p1}} \cdot U$$

At low values of the excitation density, the luminescence intensity thus increases linearly with the excitation intensity.

Figure 7:
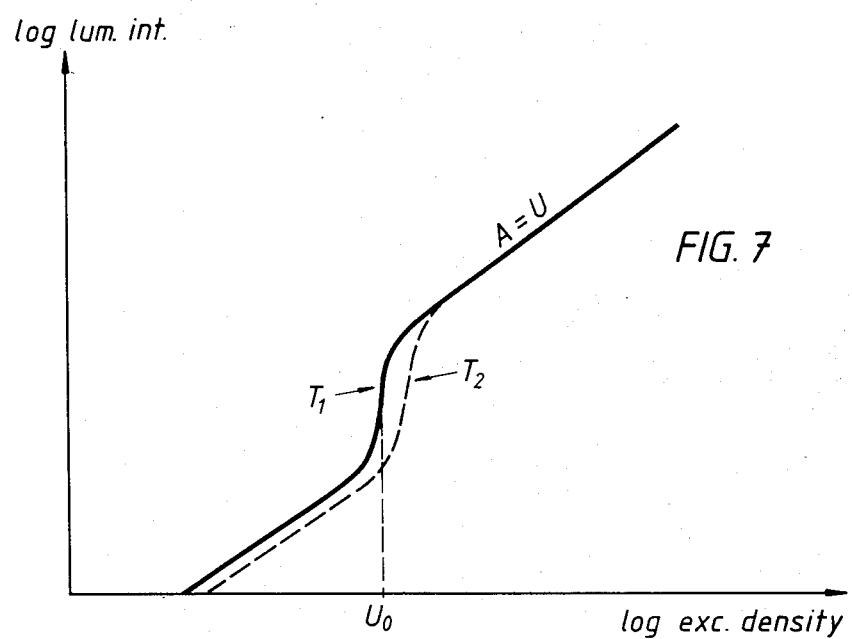
FIG. 7 shows schematically the relationship between luminescence intensity and excitation density in a typical sensor element.

From (I) it follows that $p_{T1} \simeq \sqrt{U}$. Around the excitation density $U_0$, the main part of the recombination is transferred to level 1. Thereafter the recombination takes place across level 1 and a linear relationship ($A = U$) is again obtained between A and U. FIG. 7 shows schematically the relationship between luminescence intensity and excitation density.

$U_0$ is given approximately by $$\frac{C_{p1}}{C_{p2}} \cdot \frac{N_{T1}}{e'_{p1}} \cdot U_O = N_{T2}^2$$

$$U_O = \frac{e'_{p1}}{C_{p1}} \cdot C_{p2} \cdot N_{T2}$$

However, $\frac{e'_{p1}}{C_{p1}} = K \cdot e^{\frac{-E1}{KT}} \rightarrow U_O = K^1 \cdot e^{\frac{-E1}{KT}}$ (if $C_{p2}$ is assumed to be temperature-dependent).

This mechanism thus provides a non-linear relationship between luminescence intensity and excitation intensity. This non-linear dependance varies with the temperature of the test and can therefore be utilized for temperature measurement.

The invention as exemplified above can be varied in many ways within the scope of the following claims.

What is claimed is:

1. A measuring device for measuring a physical and/or chemical quantity comprising a measuring transducer and an evaluating electronic unit interconnected by a light-conducting fiber means, said evaluating electronic unit comprising a light source means for transmitting light via said fiber means to at least one sensor element forming a part of said measuring transducer, said evaluating electronic unit also comprising light detector means for detecting light emitted from said sensor element, wherein
    said at least one sensor element possesses a non-linear relationship between the intensity of the light incident upon it and the intensity of the light emitted from it,
    said light source means is emitting light at least at two different light intensities, and
    said detector means measuring the light emitted from said sensor element in response to the different incident light intensities.

2. A measuring device according to claim 1, wherein said non-linearity of the sensor element has the relationship $I_u = (I_i)^n$, where $I_i$ is the intensity of the incident light reaching the sensor element, n is a real number which is influenced by the quantity being measured, and $I_u$ is the intensity of the light emitted by the sensor element.

3. A measuring device according to claim 1 or claim 2, wherein drive means for said light source means is provided to excite the latter at two different output levels, and the signals from the detector means corresponding to these different output levels are supplied to a quotient forming means in the evaluating electronic unit for obtaining the measuring signal.

4. A measuring device according to claim 3, wherein means is provided to excite the light source means at the two different output levels and wherein the corresponding measurements of the outputs of the detector means are made by time division multiplexing.

5. A measuring device according to claim 1, wherein said non-linearity of the sensor element has a relationship in the form of linear functions divided into at least three linear partial segments, each represented by an equation of the first degree and of the form $I = ax + b$ and where adjacent segments have different derivatives in their respective linear functional relationships.

6. A measuring device according to claim 5, wherein each quantity to be measured is arranged to influence a different segment of said non-linear relationship, whereby at least two different quantities can be measured at the same time.

7. A measuring device according to claim 5, wherein the light signal from each sensor element is arranged to be measured for at least three light effects of the light source means, and the evaluating electronic unit comprises a computing electronic means for obtaining parameters in the non-linear relationship between the light effect from the light source means and the output from the detector means, and for computing measured values from these parameters.

8. A measuring device according to claim 5, wherein the non-linear relationship between the light effect from the light source means and the output from the detector means is arranged to be read into an electronic memory in the evaluating electronic unit and to be compared with at least one stored reference non-linearity for computing a measured value.

9. A measuring device according to any one of claim 1, 2 or 5, wherein the non-linear relationship is provided by a semiconductor material with non-linear light absorption properties.

10. A measuring device according to claim 1, wherein the non-linear relationship is obtained by means of a circuit connected between a photo-diode and an LED in the measuring transducer.

11. A measuring device according to claim 3, wherein means is provided to excite the light source means at the two different output levels and wherein the corresponding measurements of the outputs of the detector means are made by frequency division multiplexing.

12. A measuring device according to any one of claims 1, 2 or 5, wherein the non-linear relationship is provided by a semiconductor material with non-linear photo-luminescence properties.

* * * * *